Patented May 16, 1950

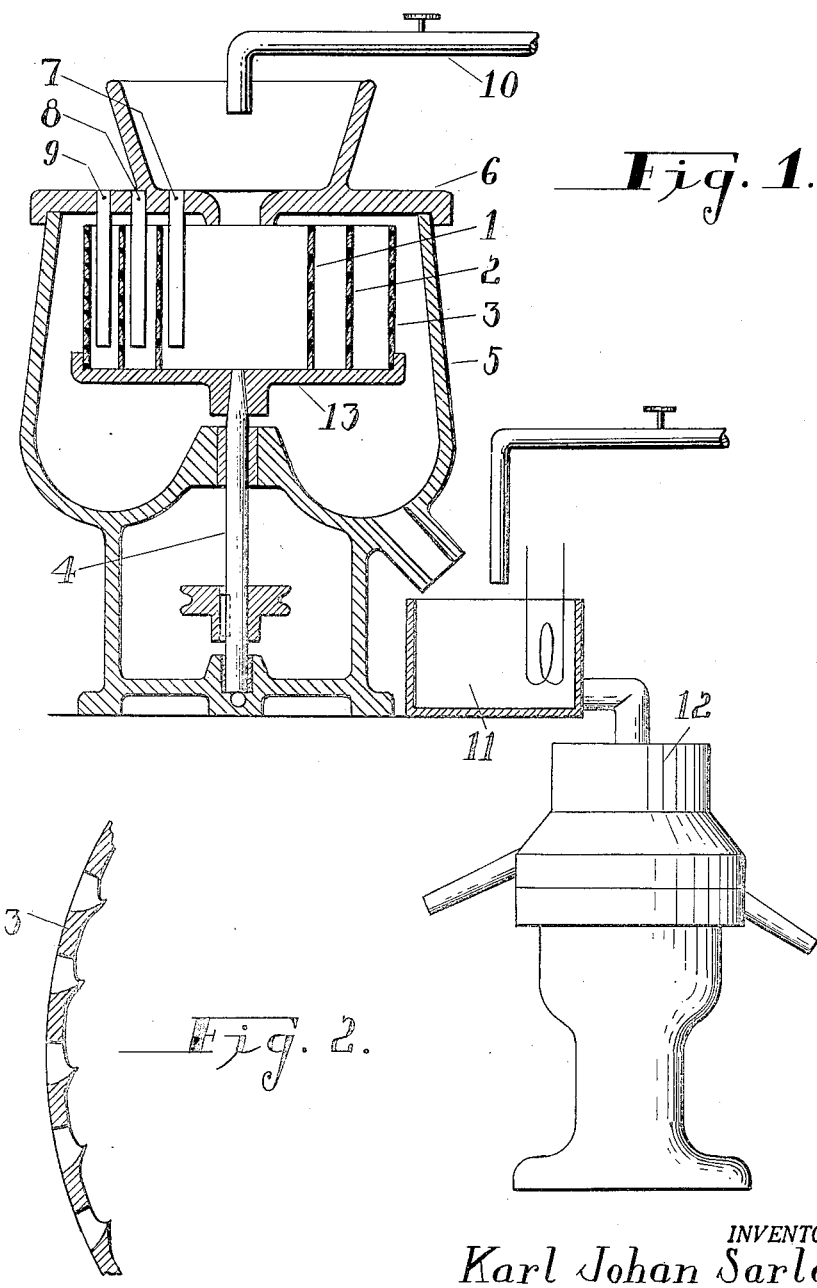

2,507,614

UNITED STATES PATENT OFFICE 2,507,614

PROCESS AND APPARATUS FOR PRODUCING OIL FROM FISH LIVER

Karl Johan Sarland, Stockholm, Sweden, assignor to Aktiebolaget Separator, Stockholm, Sweden, a corporation of Sweden Application July 31, 1946, Serial No. 687,413
In Sweden September 15, 1945

5 Claims. (Cl. 260—412.1)

Fish oil is produced either by boiling the liver and then decanting the oil, or by mechanically disintegrating it and then subsequently treating the liver mass in a centrifugal separator so as to obtain the oil. When using the latter method, the liver mass is usually diluted with water and heated before being fed into the centrifuge. The liver is mainly disintegrated either in a screw-press, in which the soft parts of the liver are pressed out, or in an apparatus equipped with a rapidly rotating drum, enclosed in a housing and provided on the outside with thin blades acting as knives. The latter apparatus also has within its housing one or more stationary knives, past which the rotating blades move.

The first process of disintegrating has the disadvantage that, owing to the fat content and the softness of the fish liver, it is difficult to bring about a sufficiently high pressure to ensure that all the fat-bearing substance is pressed out of the liver. The solid mass remaining after the pressing must therefore generally be re-pressed or boiled.

Since the rotating knives are fixed on to the outside of the rotor, the second disintegrating process possesses the disadvantage that the centrifugal force acts outwardly on the parts of the liver caught by the knives, i. e. against the direction of the feed, and consequently reduces the capacity of the apparatus and also its ability to disintegrate the liver's tough tendons, which may therefore pass through the apparatus. As it is unsuitable to introduce the tendons into the centrifugal separator, they must first be strained off which, owing to the stickiness of the disintegrated mass, must be done in relatively large vibrating strainers, which render the plant more expensive and, above all, require considerable space; the latter being a great disadvantage on board ships, trawlers and the like.

The present invention relates to a process by which the objections and disadvantages referred to above are eliminated, and is characterized in that the liver is finely disintegrated in an arrangement composed of a number of co-axially arranged rapidly rotating, perforated cylinders, into the innermost of which the liver is fed. The finely disintegrated mass, preferably after being diluted with hot water and possibly further heated, is introduced into a centrifugal separator in which the oil is separated from the water and sludge.

The innermost cylinder should preferably be of such a construction that the rims of the holes form on its inside bent-up and curved edges which increase the disintegrating effect. The liver is pressed against the inner wall of the inner cylinder by the centrifugal force so that the perforated surface of the cylinder cuts off small parts of the liver, which then pass out through the holes referred to above. Inside the cylinder are one or more devices, such as fixed rods, which obstruct rotation of the liver to the extent of preventing its rotation at the speed of rotation of the cylinder. The next cylinder outwards is provided with somewhat finer holes so that a further disintegration takes place and with similar devices preventing the mass from rotating at the cylinder's speed of rotation. If required, one or more cylinders may be arranged outside those described above.

Fig. 1 is a vertical sectional view of an apparatus, embodying the structural features above described for practicing the process. Fig. 2 is an enlarged horizontal sectional view through a part of one of the cylinders. The apparatus as illustrated comprises the perforated cylinders 1, 2 and 3, mounted on a base 13 carried by a shaft 4. The cylinders are enclosed by a stationary housing 5 covered by lid 6, to which the rods 7, 8 and 9 are fixed. Water may be fed in through pipe 10. From the housing 5 the liver-mass is discharged into a tank 11 where more water may be added and in which the liver may be further heated. The separation is then carried out in the centrifugal separator 12.

The thin tendons of the liver are very tough and very resistant to mechanical action and a considerable part of them cannot therefore be disintegrated. Such tendons remain in the innermost cylinder in which they tangle up in balls and wind around the rods referred to above. When so many tendons have accumulated in the cylinder that the disintegrating capacity begins to reduce, the apparatus is stopped, the tendons taken out and the apparatus re-started. This operation requires but very little time.

As the tendons are almost completely freed of fat-containing cellular tissue, the yield of oil is high and the lumps of tendons do not need to be further treated.

The apparatus heretofore required for straining the disintegrated liver can be entirely dispensed with and therefore the plant is relatively cheap and does not occupy more than half of the space of the plants used heretofore, which is very important, especially on board ships.

As with the prior methods it is suitable, in conjunction with the disintegration, or subsequent thereto, to mix the disintegrated liver with hot water so that a higher yield is obtained and so that the separator can run for longer periods without being cleaned. It may also be preferable to heat the diluted liver further before introducing it into the separator. It is however not necessary to heat it to a temperature detrimental to vitamins.

It will be understood that the invention is not limited to the use of the process in conjunction with fish liver. It may also be advantageously used to treat other similar products that contain oil in their connective tissue and from the major part of which the oil is required to be separated. An apparatus of the kind described above is well adapted for such treatment. As an example may be mentioned the use of the apparatus to treat fish viscera and whale-blubber, which may suitably be heated to a temperature at which their fat cells burst more easily.

What I claim and desire to protect by Letters Patent is:

1. An apparatus for use in producing oil from fish liver and similar products and which is adapted to disintegrate the liver and remove tendons or connective tissues and produce a product especially adapted for centrifugal separation of the oil, said apparatus comprising a plurality of perforated, concentric, cylindrical disintegrators, a member supporting said disintegrators for rotation about a generally vertical axis coinciding approximately with the disintegrator axes, each cylinder having perforations spaced circumferentially and axially thereof, a stationary housing surrounding the disintegrators, means for feeding the liver mass into the innermost disintegrator and above said supporting member, whereby the disintegrated liver mass passes successively from the inner disintegrator outwardly through said perforations and eventually escapes from the outermost disintegrator through its perforations into the space between said housing and the disintegrators, and rods projecting into each disintegrator and immersed in the mass therein to prevent rotation of the mass at the speed of rotation of the disintegrator to effect partial disintegration of the mass and cause the same to slide relative to said perforations, the rims of said perforations being bent inward to form cutting edges acting upon the tendons due to said sliding movement, and the perforations of the inner disintegrator being larger than the perforations of an outer disintegrator.

2. In the treatment of fish liver, the process which comprises subjecting a liver mass to a series of successive disintegration actions to disintegrate the liver and remove tendons or connective tissue therefrom, by confining and rotating a mass of the liver about a vertical axis in a primary zone while partially obstructing the mass rotation to cause the inner portion of the mass to rotate at a lower speed than the outer surface of the mass, scraping and cutting off small pieces of the mass near said outer surface during said rotation and while discharging disintegrated liver from the outer surface of the rotating mass through a plurality of relatively large paths into a secondary zone surrounding said first zone, retaining the coarser separated tendon material in said primary zone, effecting a similar obstructed rotation of the mass in said secondary zone concurrently with the obstructed rotation in the first zone, and subjecting said secondary rotating mass to a finer scraping and cutting near its outer surface while discharging finely disintegrated liver outwardly therefrom through a plurality of paths smaller than said first paths.

3. The process according to claim 2, comprising also the step of periodically removing said retained coarser tendon material from the primary zone.

4. The process according to claim 2, comprising also the steps of diluting the finely disintegrated liver from said secondary zone with water, to form a mixture of oil, water and sludge, and then centrifuging said mixture to separate the oil from the water and sludge.

5. The process according to claim 2, comprising also the steps of diluting the finely disintegrated liver from said secondary zone with water and heating the same, to form a heated mixture of oil, water and sludge, and then centrifuging the heated mixture to separate the oil from the water and sludge.

KARL JOHAN SARLAND.

REFERENCES CITED

The following references are of record in the file of this patent:

UNITED STATES PATENTS

| Number | Name | Date |
|---|---|---|
| 1,483,742 | Nicol | Feb. 12, 1924 |
| 1,734,661 | Wood | Nov. 5, 1929 |
| 2,177,358 | Atwood | Oct. 24, 1939 |
| 2,186,672 | Fromm | Jan. 9, 1940 |
| 2,215,226 | Myer | Sept. 17, 1940 |
| 2,302,138 | Nicholson | Nov. 17, 1942 |
| 2,413,692 | Crowther | Jan. 7, 1947 |

FOREIGN PATENTS

| Number | Country | Date |
|---|---|---|
| 236,422 | Germany | July 12, 1911 |
| 259,632 | Germany | May 10, 1913 |
| 263,660 | Great Britain | Jan. 6, 1927 |